Feb. 22, 1944.  A. G. FRAZER-NASH ET AL  2,342,534
BENDING AND SHAPING APPARATUS
Filed May 28, 1942

Inventors
Archibald G. Frazer-Nash
George Kenneth Hills
By Glascock Downing Diebold Attys Patented Feb. 22, 1944

2,342,534

UNITED STATES PATENT OFFICE 2,342,534

BENDING AND SHAPING APPARATUS

Archibald Goodman Frazer-Nash and George Kenneth Hills, Tolworth, England

Application May 23, 1942, Serial No. 444,902
In Great Britain December 5, 1940

2 Claims. (Cl. 18—19)

This invention relates to the shaping by bending or curving thermoplastic materials in sheet form, more especially synthetic resins and resin compositions, for instance transparent synthetic resin composition of the polyacrylate or polymethacrylate class, and has for its object to provide improved apparatus for the production of curved or otherwise bent panels for use in aircraft.

Apparatus in accordance with the invention comprises a former or patrix of appropriate shape having hingedly connected with it a frame element adapted to be brought into a position to co-operate with the former in the bending or shaping operation and to be secured in the position in which it constrains the sheet material into conformity with the operative surface of the former, and is provided with means whereby it may be clamped in this position until the thermoplastic material is hardened to the desired degree.

The invention will be described further in detail and with reference to the accompanying drawing.

Figure 1:
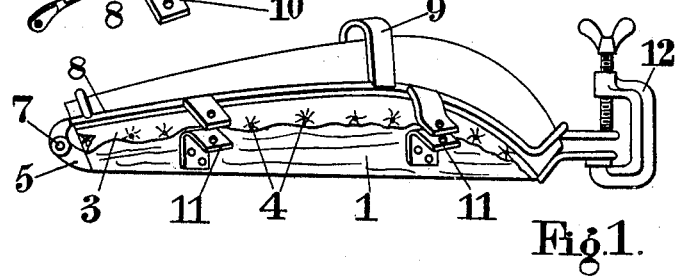
Figure 1 is a view in side elevation.
Figure 2:
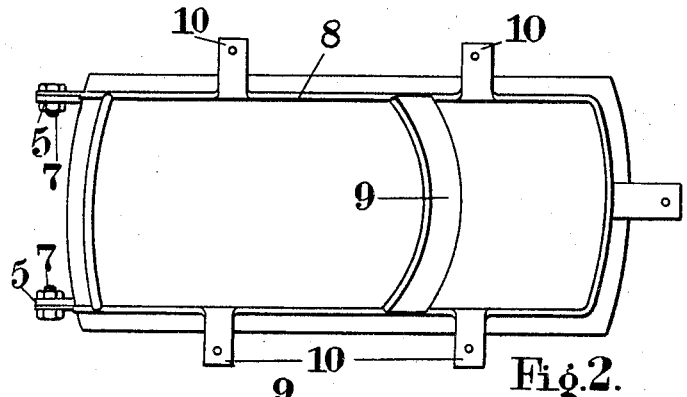
Figure 2 is a view in plan.
Figure 3:
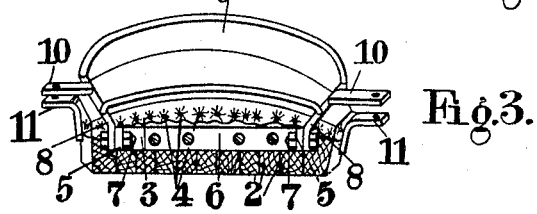
Figure 3 is a view in end elevation of an apparatus for shaping by bending or curving thermoplastic material in sheet form, in accordance with the invention.

Referring more particularly to Figures 1 to 3, the apparatus comprises a former 1, which as may be seen from Figure 3, may be formed of blocks of wood 2 jointed together to form a laminated structure, the top surface of which is carefully machined or trimmed to the curved form which the sheets are required to take. This surface is covered with a layer of fine fabric 3 such as cotton lawn, stretched over it as tightly as possible to give an absolutely smooth surface, and tacked as at 4, or otherwise secured along the side of the former.

Figure 4:
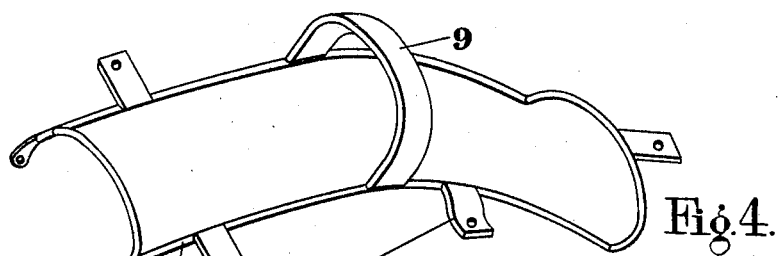
Figure 4 is a detail thereof.

On one side of the former are secured hinge brackets 5 which in the construction illustrated take the form of a channel shaped strip of metal, the two upstanding legs constituting the brackets while the base 6 is utilised for securing the member to the former. Pivoted at 7 to these brackets is a frame member 8 which is also shown in Figure 4, comprising an open framework defining approximately the outer extremities or periphery of the desired finished curved panel or sheet and formed, preferably, of round steel rods of suitable cross-section to withstand the stresses which will be encountered during the processing of the sheet.

This frame is provided with one or more crosspieces 9 which stand clear of the surface of the former to provide bracing for the frame. Secured at spaced points around the frame are a plurality of lugs 10 adapted to be engaged by clamps and co-operating with each of these lugs are further clamping lugs 11 secured in any suitable manner, to the sides of the former, the arrangement being such that these lugs are normally spaced from one another so that pressure can be transmitted to the frame by applying a clamping means, such as the cramp 12, to the lugs and screwing down as required.

Figure 5:
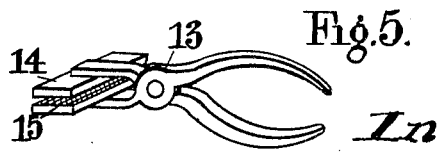
Figure 5 is an illustration of a tool for use in connection with the apparatus.

To enable the sheet to be handled, when on the former, tongs 13 (see Figure 5) are used, each comprising a tool in the form of pliers whose jaws have integral therewith or secured thereon plate-like members 14 to give ample gripping surface, the gripping being enhanced by providing a knurled or corrugated surface on their inner faces 15.

The flat sheets of thermoplastic material to be treated are cut by means of a saw, to the rough size and in some cases to the shape of the finished panel so as to leave a substantial margin round the extremity of the required form, cleaned and hung in an oven for at least 10 to 15 minutes, depending on its thickness, at a temperature of from 250° to 275° to render the sheet pliable when it is removed from the oven and placed in its correct position on the surface of the former which has been previously smeared with a greasy material such as the grease sold under the name "Belmoline grease, modified C" so as to form a buffer layer between the surface of the former and the sheet of thermoplastic material.

The frame member is now swung over on to the former to press the sheet down, initially roughly to the shape of the former and a clamp applied lightly at the point opposite to the hinge. The sheet naturally will kink due to the curvature and this is taken care of by gripping the edges of the sheet at points opposite the kinking with the tongs and stretched and as the sheet pulls out into shape a clamp is applied to a pair of lugs and screwed down tightly and the same operation is applied at all other points where required and clamps applied as the sheet pulls out smoothly until all the clamps are applied and the frame screwed down tightly.

This stretching and shaping operation must be done rapidly so that it is completed before the sheet cools to a temperature when the material ceases to be pliable.

The curved sheet is allowed to cool, when it is removed from the former and then trimmed round its edges to its final shape by means of a saw.

The former can be used again and only requires to be smeared again with the grease referred to hereinbefore.

We claim:

1. In combination, a former member, an open frame hinged at one point to said former member and including a plurality of connected members, pairs of lugs carried by and projecting outwardly from said members for enabling the application of pressure to said members, and reinforcing members connecting the opposed members of said frame.

2. In combination, a former member, an open former member hinged at one point to said former member, pairs of lugs carried by said members for enabling the application of pressure to said members, reinforcing members connecting the opposed portions of said frame member, and a layer of fabric in sheet form applied over the former member and secured to the edges thereof at a point lying outside of the confines of the open frame member.

ARCHIBALD GOODMAN FRAZER-NASH.
GEORGE KENNETH HILLS.